United States Patent [19]

Hendrickson

[11] Patent Number: 4,777,353

[45] Date of Patent: Oct. 11, 1988

[54] VALUE WHEEL ROD LOCK

[75] Inventor: Richard J. Hendrickson, Danville, Calif.

[73] Assignee: f.m.e. Corporation, Hayward, Calif.

[21] Appl. No.: 120,296

[22] Filed: Nov. 13, 1987

[51] Int. Cl.[4] .......................... G06C 25/00; G06F 1/00

[52] U.S. Cl. ................................ 235/101; 235/130 R; 235/131 FD

[58] Field of Search .............. 235/101, 130 R, 131 R, 235/131 F, 131 D, 131 M, 131 JA; 101/91

[56] References Cited

U.S. PATENT DOCUMENTS

| | | | |
|---|---|---|---|
| 3,229,906 | 1/1966 | Balaz et al. | 235/101 |
| 3,823,666 | 7/1974 | Hanson | 235/101 X |
| 4,160,899 | 7/1979 | Montagnino et al. | 235/101 |
| 4,644,142 | 2/1987 | Payn | 235/101 |
| 4,656,341 | 2/1987 | Payn et al. | 235/101 |

*Primary Examiner*—B. R. Fuller

*Attorney, Agent, or Firm*—Townsend and Townsend

[57] ABSTRACT

A value wheel rod lock is used to selectively lock value rods, mounted to a rotatable shaft of a postage meter, against axial movement according to the rotary position of the shaft. The rod lock includes a knife blade pivotally mounted to the shaft for rotation with the main shaft. The knife blade is spring biased away from engagement with the value rods. The knife blade is mounted to a cam follower which engages a circumferential cam surface surrounding the shaft. The cam surface is configured so that over a range of angular positions of the shaft the knife blade is biased against the value rods. This forces the value rods against a high friction backing pad mounted to the shaft with sufficient force to keep the value rods from being moved axially. When the shaft is at its home position, during which the meter values can be changed, the knife blade is biased away from the value rods to allow the value rods to be freely movable.

16 Claims, 1 Drawing Sheet

VALUE WHEEL ROD LOCK

BACKGROUND OF THE INVENTION

This invention is directed to a locking mechanism for use with a metering product of the type including value rods mounted to the rotatable drive shaft which rotates the print head. In particular, it is directed to a locking device which allows or prevents the axial movement of the value rods according to the rotary position of the drive shaft.

Postage meters are used to dispense postage in lieu of postage stamps. They do so by printing the postage value directly on the letter or on a separate slip of paper which is secured to the letter or package by an adhesive. Meters are constructed with many anti-fraud devices and features to prevent improper use or tampering. Some of the anti-fraud devices prevent access to critical components while others substantially prevent unauthorized changes to critical components. Some components are made so that unauthorized tampering or use will be evident upon inspection of the meter. One such meter is shown in U.S. Pat. No. 4,644,142, issued Feb. 17, 1987.

One critical component is that used to print the postage value. The printing elements are often print wheels which are mounted adjacent an opening in the indicium plate mounted to the print head. The print head rotates one complete revolution to make one impression. While the print head is at the home (stationary) position, the rotary positions of the print wheels, and thus the values of the impressions printed, can be changed. This can be accomplished through a drive train including elongate rods, called value rods, mounted to the drive shaft. The value rods rotate with the drive shaft, which rotates the print head, and move axially to change the rotary positions of the print wheels. The print wheels are protected from tampering while the drive shaft and print head are in the home position by non-removable shielding. However, the print head is necessarily exposed during that portion of the print cycle surrounding the making of the impression and the inking of the die. Tampering is possible by halting the rotation of the print head during this portion of the print cycle unless some form of protection is provided.

SUMMARY OF THE INVENTION

The present invention is directed to a value wheel rod lock which secures the value rods of a metering product, typically a postage meter, in their axial positions when the drive shaft is rotated out of its home position. This is done to prevent a user from improperly rotating one or more value print wheels, which are connected to the value rods. The value wheel rod lock has been found to be useful when the metering product is owned by, and thus can be opened by, the user.

The value wheel rod lock of the invention is used to lock the value rods, mounted to the rotatable drive shaft of the meter, in place and thus prevent their axial movement according to the rotary position of the shaft. The rod lock includes biasing element, such as a knife blade, movably mounted to the drive shaft for rotation with the drive shaft. The biasing element is movable between first and second positions at which the biasing element is substantially separated from and is forcefully engaged with the value rods. The biasing element is preferably spring biased away from engagement with the value rods.

The biasing element is mounted to a cam follower which engages a circumferential cam surface surrounding the shaft. The cam surface is configured so that over a selected portion of the rotation of the shaft, the cam follower and thus the biasing element is biased into the second position against the value rods with sufficient force to keep the value rods from being moved axially. When the shaft is at its home position, during which the meter values can be changed, the cam surface is configured so the cam follower and biasing element therewith are biased away from the value rods to the first position through the action of the cam follower spring. A backing pad, preferably of firm but somewhat resilient rubber having a high friction surface, can be mounted to the drive shaft beneath the value rods in the vicinity of the biasing element. Therefore the biasing element forces the value rods against the backing pad to provide additional resistance to axial movement of the value rods when the value rods are engaged by the biasing element.

One advantage of the invention is its simplicity. It can be used without requiring significant modification to an existing meter product.

During the operation of certain meters, such as that disclosed in U.S. Pat. No. 4,644,142, it may be possible to stop the printhead during a portion of the metering cycle after the drive shaft and printhead have left the home position. For example, this can be accomplished with some meters by unplugging the meter from an electrical outlet. If done at the proper time, the printwheels may be exposed through the opening in the indicium plate. Through such extraordinary measures it may be possible for a dishonest user to manually force the printwheels from their proper positions. When the meter is re-energized, the forced (typically higher) print value is that which is printed. However, the descending register of the meter will record the print wheel value existing at the start of the print cycle. This will allow a dishonest user to print a value in excess of that deducted from the descending register. To prevent this from occurring, the invention securely locks the value rods, to which the printwheels are connected, in place during the period of the print cycle which the user could have access to the printwheels. The force exerted by the biasing element is sufficiently high so that forcing the printwheels out of position while locked by the biasing element would cause portions of the meter (such as rack and pinion gear elements which could be used to couple the print wheels and the value rods) to be destroyed or at least damaged. Thus tampering becomes quite evident upon inspection of the unit by authorized postal employees. In addition, even if the force exerted by the biasing element is insufficient to prevent movement of the value rods or to destroy any of the components of the meter, using a hard metal knife blade as the biasing element will cause telltale marks to be left on the value rods, due to their scraping along the knife blade, to provide an indication of tampering.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
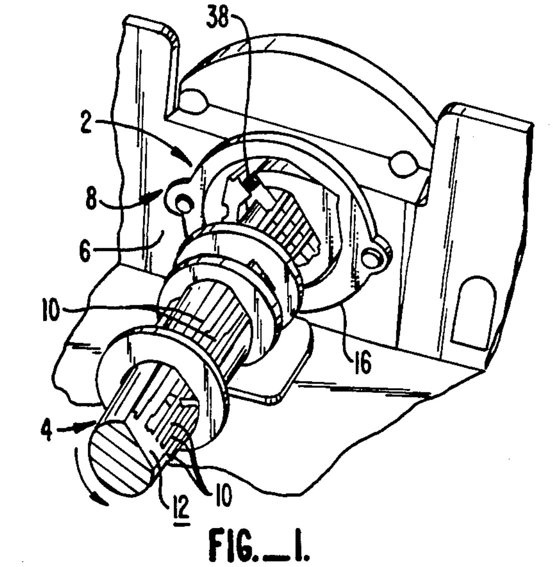
FIG. 1 is a perspective view of a portion of a postage meter showing a drive shaft supported by the meter base and a value print wheel rod lock mounted about the drive shaft, the drive shaft being shown just entering the home position.
Figure 2B:
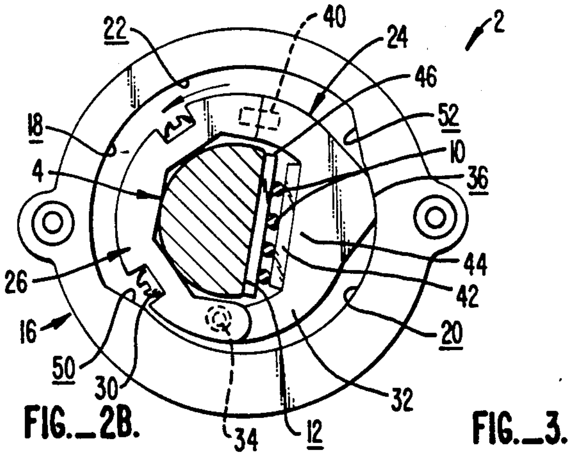
FIG. 2B shows the value wheel rod lock advanced about 330° from the position of FIG. 1 so the knife blade is biased towards the value rods, so to lock the value rods in place, by engagement of the cam follower with a raised portion of the cam surface.
Figure 3:
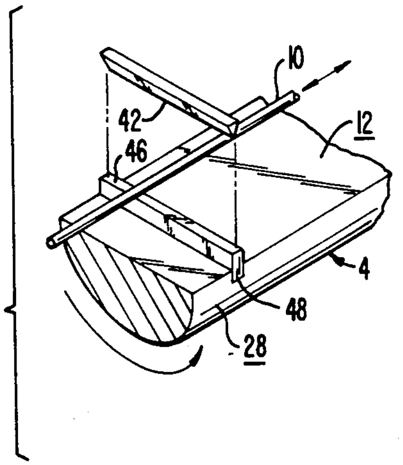
FIG. 3 is a simplified exploded representation illustrating various components shown in FIG. 1.
Figure 2A:
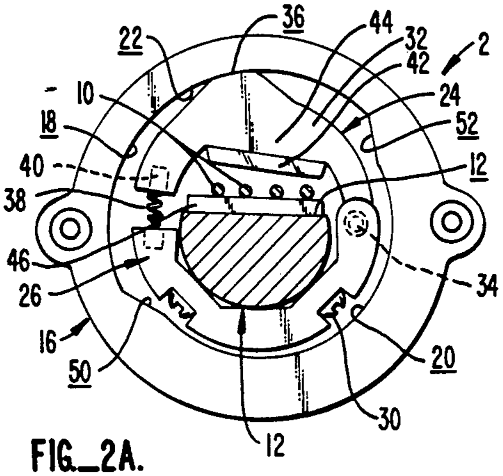
FIG. 2A is a simplified end view of the value wheel rod lock with the drive shaft advanced about 30° from the position of FIG. 1 to the home position so that the knife blade is biased away from the value rods to permit the value rods to be freely movable.

Referring now to the figures, value wheel rod lock 2 is shown used with the drive shaft 4 of a postage meter (not shown). Drive shaft 4 has a D-cross-sectional shape and is supported at one end by a wall 6 of the meter base 8. The meter, of the type shown in U.S. Pat. No. 4,644,142, uses a number of value rods 10 mounted to drive shaft 4 along its flat surface 12. The disclosure of U.S. Pat. No. 4,644,142 is incorporated by reference. Value rods 10 rotate with shaft 4. The axial positions of value rods 10 are adjusted according to the axial positions of coupler rings 14 along shaft 4, each coupler ring secured to a value rod 10.

Rod lock 2 includes a cam 16 mounted to wall 6 of meter base 8. Cam 16 has an internal cam surface 18 with a radially inwardly positioned, raised surface portion 20 and a radially outwardly positioned portion 22. Lock 2 also includes cam follower assembly 24 including a first portion 26 secured to curved surface 28 of shaft 4 by screws 30 and a second portion 32 pivotally mounted to first portion 26 at pivot 34. Second portion 32 acts as a cam follower 32 and includes a contact surface 36 which engages cam surface 18 of cam 16 through the bias of a spring 38 mounted within blind holes 40 formed in first portion 26 and cam follower 32.

Cam follower 32 includes a wedge-shaped knife blade 42 mounted to an inside region 44 of cam follower 32 to face value rods 10. Rod lock 2 also includes a backing pad 46 made of high density rubber mounted within a groove 48 formed in flat surface 12 of shaft 4 in the vicinity of knife blade 42. Raised cam surface portion 20 is positioned so that when contact surface 36 of cam follower 26 rides along surface 20, knife blade 42 firmly contacts value rods 10 and presses the value rods against backing pad 46. Knife blade 42 is made of a hardened alloy steel, such as 4130, with a surface hardness of 55 on the Rockwell C scale. It has been found that the combination of a relatively stiff but somewhat resilient backing pad 46 having a high friction outer surface, coupled with a hard metal knife blade provides superior movement resisting properties in comparison with, for example, the use of resilient gripping pads for both the backing pad and the biasing element. Also, forcing value rods 10 to move axially while engaged by knife blade 42 causes noticeable marks to be made on the value rods, marks which would be visible during inspection by postal authorities to indicate tampering.

The length of raised cam surface portion 20 is sufficient to lock value rods 10 in place during that portion of the print cycle which a user could gain access to the print wheels. Surface portion 22 is sized to allow knife blade 42 to disengage from value rods 10 during the remainder of the print cycle. In the preferred embodiment this occurs about 135 degrees before the drive shaft 4 is in the home position of FIG. 1. Very shortly after moving from the home position during a print cycle, contact surface 36 engages a first ramped surface portion 50 connecting portions 20, 22 to bias knife blade 42 against value rods 10. At the end of surface portion 20, contact surface 36 engages a second ramped surface portion 52 to guide contact surface 36 back into engagement with surface portion 22; this allows spring 38 to bias cam follower 32, and thus knife blade 42 therewith, away from value rods 10.

Modification and variation can be made to the disclosed embodiment without departing from the subject of the invention as defined in the following claims. For example, cam follower 32 could be pivotally mounted directly to shaft 4. Also, instead of being pivotally mounted, cam follower 26 could be mounted for other types of movement, such as rectilinear movement. The biasing element could be positioned between drive shaft 4 and value rods 10 and could be other than a wedge-shaped knife blade. Also, the biasing element could engage value rods 10 when drive shaft 4 is at the home position but with a sufficiently low value rod biasing force so that the value rods are substantially unhindered in their axial movement. Although value rods 10 may be smooth, their outer surfaces may be roughened or grooved to enhance locking by knife blade 42 and backing pad 46. The invention is applicable to metering products other than postage meters.

I claim:

1. A value wheel rod lock for use with a metering product of the type including a rotatable shaft supported by a base and carrying a number of value rods, the value rods movable axially when the shaft is at a home position, the value wheel rod lock comprising:
   - a value rod engaging device including a biasing element movable between a first, value rod disengaged position, at which axial movement of the value rods is substantially unhindered by the value rod engaging device, and a second, value rod engaged position, at which axial movement of the value rods is prevented by the biasing element exerting a radial force on the value rods; and
   - an actuator for positioning the value rod engaging device in the second position so to force the biasing element against the value rods according to the rotary position of the shaft.

2. The value wheel rod lock of claim 1 wherein the value rod engaging device includes a first portion secured to the shaft and a second portion, including the biasing element, movably mounted to the first portion.

3. The value wheel rod lock of claim 1 wherein the biasing element is pivotally mounted to the shaft.

4. The value wheel rod lock of claim 3 wherein the rod engaging device includes a spring for biasing the biasing element away from the value rods.

5. The value wheel rod lock of claim 1 wherein the biasing element includes a movable knife blade.

6. The value wheel rod lock of claim 5 wherein the knife blade is wedge-shaped.

7. The value wheel rod lock of claim 1 wherein the value rod engaging device includes a backing pad situated between the value rods and the shaft and in the vicinity of the biasing element.

8. The value wheel rod lock of claim 7 wherein the backing pad has a high friction surface.

9. The value wheel rod lock of claim 7 wherein the backing pad is resilient.

10. The value wheel rod lock of claim 7 wherein the backing pad is mounted to the shaft.

11. The value wheel rod lock of claim 7 wherein the biasing element includes a knife blade.

12. The value wheel rod lock of claim 1 wherein the actuator includes a cam mounted to the base and having a cam surface engageable by the value rod engaging device over at least a portion of the rotary movement of the shaft.

13. The value wheel rod lock of claim 12 wherein the value rod engaging device includes a first portion secured to the shaft and a second portion, including the biasing element, movably mounted to the first portion.

14. The value wheel rod lock of claim 13 wherein the rod engaging device includes a spring for biasing the second portion away from the first portion.

15. A value wheel rod lock for use with a metering product of the type including a rotatable shaft supported by a base and carrying a number of value rods, the value rods movable axially when the shaft is at a home position, the value wheel rod lock comprising:

a value rod engaging device including a first portion secured to the shaft, a second portion movably mounted to the first portion, a spring for biasing the second portion away from the first portion, and a backing pad situated between the value rods and the shaft in the vicinity of the biasing element, the backing pad having a high friction surface, the second portion movable between a first, value rod disengaged position, at which axial movement of the value rods is substantially unhindered by the value rod engaging device, and a second, value rod engaged position, at which axial movement of the value rods is prevented by the second portion exerting a radial force on the value rods and forcing the value rods against the backing pad high friction surface; and a cam mounted to the base and having a cam surface engageable by the value rod engaging device over at least a portion of the rotary movement of the shaft so to bias the second portion into the second position and against the value rods during a portion of the rotation of the shaft away from the home position.

16. The value wheel rod lock of claim 15 wherein the second portion includes a knife blade element which contacts the value rods when the second portion is in the value rod engaged position.

* * * * *